FIG. 1

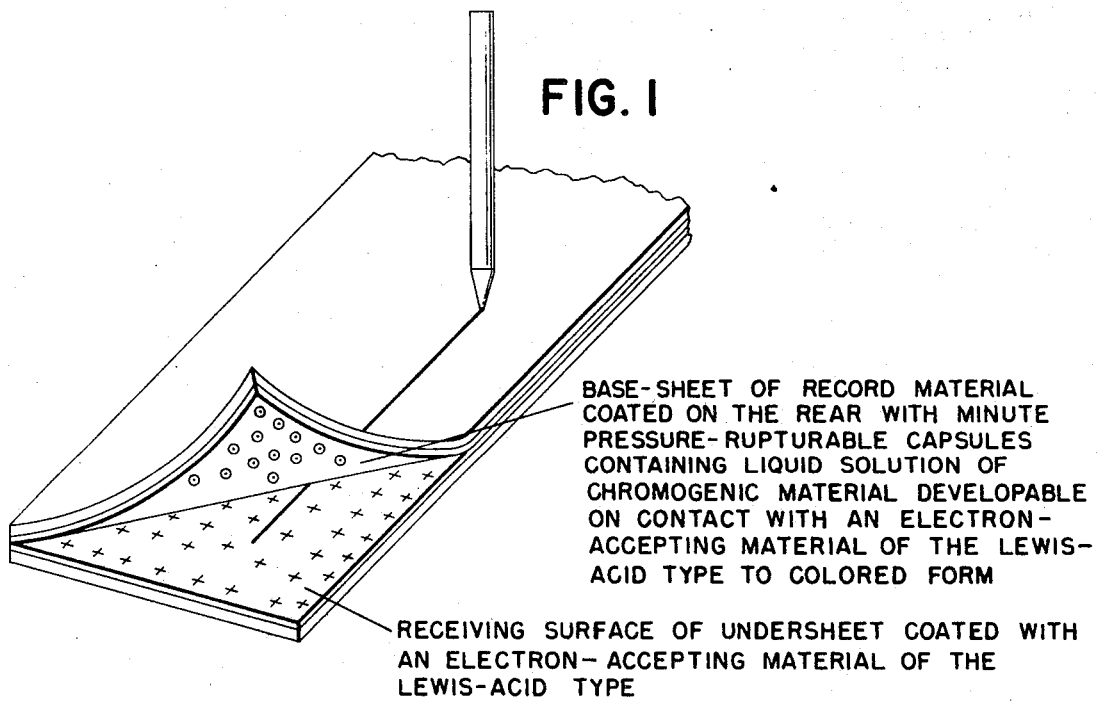

BASE-SHEET OF RECORD MATERIAL COATED ON THE REAR WITH MINUTE PRESSURE-RUPTURABLE CAPSULES CONTAINING LIQUID SOLUTION OF CHROMOGENIC MATERIAL DEVELOPABLE ON CONTACT WITH AN ELECTRON-ACCEPTING MATERIAL OF THE LEWIS-ACID TYPE TO COLORED FORM

RECEIVING SURFACE OF UNDERSHEET COATED WITH AN ELECTRON-ACCEPTING MATERIAL OF THE LEWIS-ACID TYPE

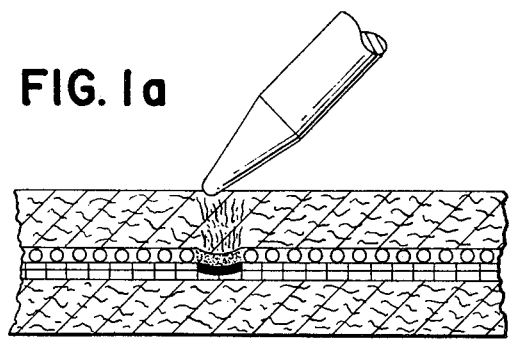

FIG. 1a

INVENTOR
CHAO-HAN LIN

United States Patent Office 3,540,910
Patented Nov. 17, 1970

3,540,910
PRESSURE SENSITIVE RECORD SHEETS EMPLOYING INDOLE- AND CARBAZOLE-SUBSTITUTED PHTHALIDES
Chao-Han Lin, Dayton, Ohio, assignor to The National Cash Register Company, Dayton, Ohio, a corporation of Maryland
Original application Jan. 30, 1967, Ser. No. 612,369, now Patent No. 3,491,111, dated Jan. 20, 1970. Divided and this application Jan. 24, 1969, Ser. No. 817,596
Int. Cl. B41m 5/22
U.S. Cl. 117—36.2                  46 Claims

ABSTRACT OF THE DISCLOSURE

A pressure sensitive record unit and method of marking, employing chromogenic material of normally colorless form having a structural formula:

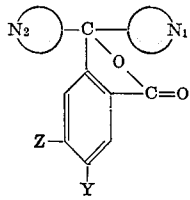

where

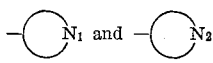

consist of mono and disubstituted indolyl radicals having the structural formula:

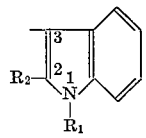

and carbazolyl radicals having the structural formula:

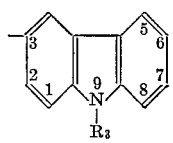

where $R_1$, $R_2$ and $R_3$ consist of alkyl radicals having from one to four carbon atoms, aryl radicals, and hydrogen; and where Y and Z consist of hydrogen and dialkylamino radicals where the alkyl substituents have from one to four carbon atoms, providing that one of Y and Z must be hydrogen and the other must be said dialkylamino radical.

Specific examples are 3,3-bis-(1,2-dimethylindol-3-yl)-5-dimethylaminophthalide and 3,3-bis-(1,2-dimethylindol-3-yl)-6-dimethylaminophthalide.

---

This is a division of application Ser. No. 612,369, filed Jan. 30, 1967, now U.S. Pat. No. 3,491,111.

This invention pertains to novel chromogenic compounds for use in pressure sensitive record material and to an improved mark-forming manifold system incorporating these novel chromogenic compounds. More specifically, this invention pertains to 3,3-di-aryl dialkylaminophthalides which have the form of substantially colorless, i.e. white, or slightly colored solids, or approach being colorless when in liquid solution, but which may be converted to dark-colored forms upon reactive contact with acidic material. As used in mark-forming systems, marking in desired areas on support webs or sheets may be accomplished by effecting localized reactive contact between the chromogenic material and the acidic material on or in such web or sheet, such material being brought thereto by transfer, or originally there in situ, the desired reactive contact forming dark-colored materials in the intended image-marking areas.

Pressure-sensitive, mark-forming systems of the prior art include that disclosed in application for Letters Pat. No. 392,404, filed Aug. 27, 1964, by Robert E. Miller and Paul S. Phillips, Jr., now abandoned. The latter application provides a marking system of disposing on and/or within sheet support material the unreacted mark-forming components (at least one of which is a polymeric material) and a liquid solvent in which each of the mark-forming components is soluble, said liquid solvent being present in such form that it is maintained isolated by a pressure-rupturable barrier from at least one of the mark-forming components until the application of pressure causes a breach or rupture of the barrier in the area delineated by the pressure pattern. The mark-forming components thereby are brought into reactive contact, producing a distinctive mark.

It is an object of this invention to provide new and improved substances having chromogenic properties which may be incorporated in a web or coated onto the surface of a web to provide a novel manifolding unit, and which are useful in carrying out improved methods of marking involving reactive contact with a color-activating material to develop dark-colored materials in areas where marking is desired.

It is an object of this invention to provide modified compounds, based upon di-aryl dialkylaminophthalide derivatives, which are substantially colorless, or slightly colored offering a new and improved variety of chromogenic characteristics, and developing novel dark-colored substances upon contact with color-activating materials.

It is a further object of this invention to provide a new and improved mark-forming system which has the form of disposing within a web or upon the surface of a web or sheet support material unreacted chromogenic material which is capable of being reactively contacted with an acidic material to produce a dark-colored substance, thus providing marks having desirable color intensity and hue.

In accordance with this invention, there are provided novel, substantially colorless or slightly colored, chromogenic compounds having the structural formula:

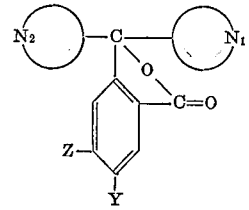

where

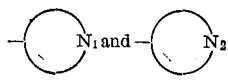

consist of mono and disubstituted indolyl radicals having the structural formula:

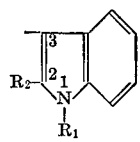

and carbazolyl radicals having the structural formula:

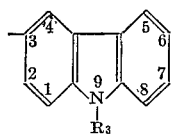

where $R_1$, $R_2$ and $R_3$ consist of alkyl radicals having from one to four carbon atoms, aryl radicals, and hydrogen; and where Y and Z consist of hydrogen and dialkylamino radicals where the alkyl substituents have from one to four carbon atoms, providing that one of Y and Z must be hydrogen and the other must be said dialkylamino radical.

Examples of these novel compounds include: 3,3-bis-(1,2 - dimethylindol-3-yl) - 5 - dimethylaminophthalide having the structural formula:

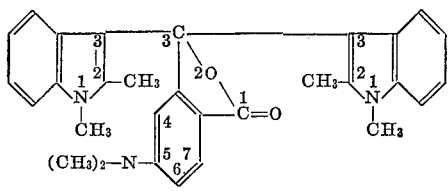

3,3-bis-(1,2-dimethylindol - 3 - yl) - 6 - dimethylaminophthalide having the structural formula:

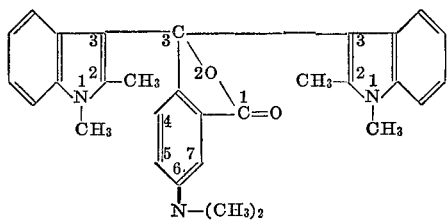

3,3-bis-(9-ethylcarbazol - 3 - yl) - 5 - dimethylaminophthalide

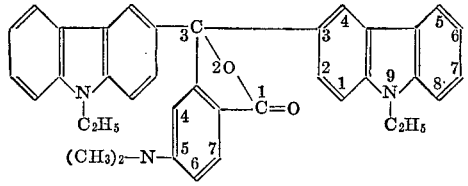

3,3-bis-(9-ethylcarbazol-3-yl) - 6 - dimethylaminophthalide having the structural formula:

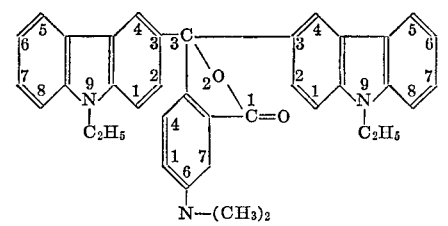

3,3 - bis - (2 - phenylindol - 3 -yl) - 5 - dimethylaminophthalide

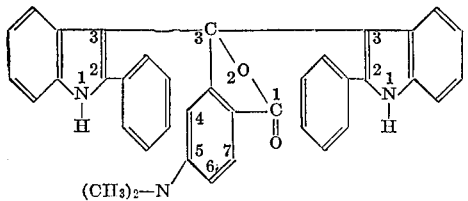

3,3 - bis - (2 - phenylindol - 3 - yl) - 6 - dimethylaminophthalide

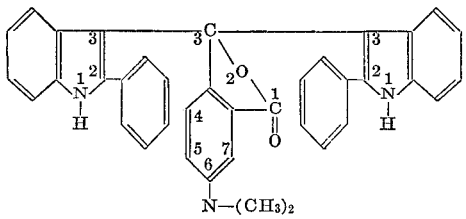

3,3 - bis - (1 - methyl - 2 - phenylindol - 3 - yl - 5 - dimethylaminophthalide

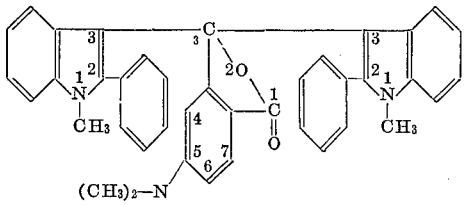

3,3 - bis - (1 - methyl - 2 - phenylindol - 3 - yl) - 6 - dimethylaminophthalide

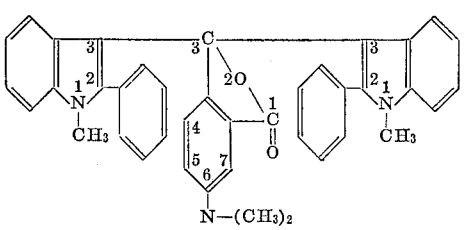

3 - (1,2 - dimethylindol - 3 - yl) - 3 - (9 - ethylcarbazol-3-yl)-5-dimethylaminophthalide

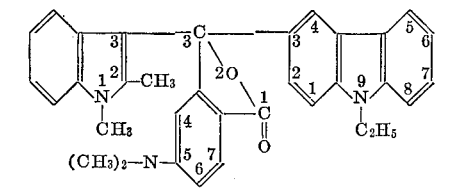

3 - (1,2 - dimethylindol - 3 - yl) - 3 - (9 - ethylcarbazol-3-yl)-6-dimethylaminophthalide.

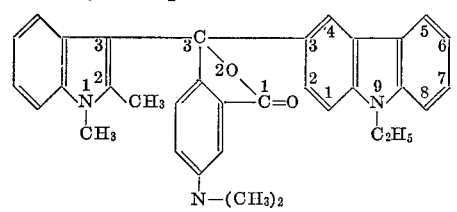

In accordance with another feature of this invention, a new composition of matter comprises the dark-colored substance having a resonant form developed by contact of a color-activating material with one of the above-mentioned chromogenic compounds. The color-developing or activating material is an acidic substance for converting the chromogenic compound to the resonant form.

The method of marking of this invention, i.e., by developing a dark-colored material from substantially colorless or slightly colored chromogenic compounds comprises providing a chromogenic compound selected from among the above-mentioned compounds and bringing such chromogenic compound into reactive contact in areas where marking is desired with an acidic color-activating substance to produce a dark-colored resonant form of the chromogenic compound by the action thereon in said areas of the said acidic substance.

The acidic materials employed in this invention can be any compound within the definition of a Lewis acid, i.e.

an electron acceptor. Preferably, acidic organic polymers such as phenolic polymers are employed as the acidic material. The novel chromogenic materials exhibit the advantage of improved color stability when reacted with such phenolic polymers. The solution formation of the solid particles of polymeric material in the same solvent with the substantially colorless chromogenic compounds allows penetration of the color into the support sheet, if porous, e.g., paper, so that the colored form of the chromogenic material sinks into the body of the sheet and is not merely on the surface of the sheet. This feature protects against erasure of recorded data by attrition of the surface of the record sheet.

Reference is to be taken to the drawings. FIG. 1 is a diagrammatic representation of a two-sheet unit manifold, a perspective in which the bottom surface of the overlying is supplied on the surface or near it with a multiplicity of minute pressure-rupturable microcapsules, each containing a droplet. Each droplet contains a solution of the basic chromogenic compound. An acidic component, such as an acid clay or a phenolic polymeric material lies within the lower web or sheet or upon the upper surface of the lower web or sheet. A colored mark is made by the use of a stylus, a type character, or other pressure-writing means applied to the two-sheet unit manifold.

The encapsulated droplets are released on the rupture of the capsules in writing operations, as shown in FIG. 1a. The liquid of the released droplets is transferred in the pattern of the data configuration to the top of the underlying sheet. The top of the underlying sheet is coated or impregnated with a material reactant with the chromogenic material, e.g., a phenolic polymer material having an acid-reacting OH group. The drawings show capsules on the over sheet containing a liquid solution of chromogenic material. However, the capsules can contain the polymeric phenolic material in liquid solution and the top surface of the under-sheet may be supplied with the chromogenic material in particulate form. The improvement in the system is the chromogenic compound which is the novel substance of the instant invention.

Referring again to FIG. 1 comprising an upper web or sheet having the chromogenic material dispersed within or upon in a contiguous juxtaposition, it is possible to incorporate the chromogenic material in a solid, crystalline-state in a binder material so that the chromogenic material may be transferred from the upper web or sheet upon the application of pressure from a stylus to deposit some of the chromogenic material on a surface carrying a color activating polymeric material. Preferably, the chromogenic substance is dissolved in a solvent and minute droplets of the solution of the chromogenic material are encapsulated in minute, pressure-rupturable capsules. Obviously, many other arrangements, configurations and relationships of the solvent and the mark-forming materials, with respect to their encapsulation and location on the supporting sheet or webs can be envisioned. Such arrangements are thoroughly described in the aforementioned application S.N. 392,404 to Miller et al. and need not be repeated herein.

It is noted that the polymeric mark-forming components should have a common solubility with the chromogenic material in at least one liquid solvent when the acid-reacting material is a phenolic or other organic acidic polymer. It is also noted that in a single system several chromogenic materials may be used with the same or different polymeric materials. Several polymeric materials can be reactively contacted with a single chromogenic compound or with a mixture of chromogenic compounds.

As mentioned above, the solvent is maintained in physical isolation in minute droplets until such time as it is released by application of pressure. This may be accomplished by several known techniques, but preferably isolation is maintained by individual encapsulation of the solvent droplets in a microcapsule according to the procedures described, for example, in U.S. Pat. No. 2,712,507, issued to Barrett K. Green on July 5, 1955; 2,730,457 issued to Barrett K. Green and Lowell Schleicher on Jan. 10, 1956; 2,800,457, issued to Barrett K. Green and Lowell Schleicher on July 23, 1957; and 2,800,458, issued to Barrett K. Green on July 23, 1957, reissued as Re. Pat. No 24,899 on Nov. 29, 1960. The microscopic capsules, when disposed within or upon a supporting web as a multiplicity in contiguous juxtaposition, are rupturable by pressure, such as normal marking pressures utilized, for example, in writing or typing operations.

The material or materials chosen as the wall material of the microcapsule, in addition to being pressure rupturable, must be inert with respect to the contents of the capsule and the other mark-forming components so that the wall material remains intact under normal storage conditions until such time as it is released by the application of marking pressure. Examples of such wall materials are gelatin, gum arabic and many others thoroughly described in the aforementioned patents.

For use in record material, the capsule size should not exceed 50 microns in diameter. Preferably, the capsules should be smaller than 15 microns in diameter.

The acidic polymeric material useful in this invention include phenolic polymers, phenol acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether maleic anhydride copolymer and mixtures thereof.

Among the phenolic polymers found useful are alkylphenol-acetylene resins, which are soluble in common organic solvents and possess permanent fusibility in the absence of being treated by cross-linking materials. A specific group of useful phenolic polymers are members of the type commonly referred to as "novolacs," (as sold by Union Carbide Corp., New York, N.Y.) which are characterized by solubility in common organic solvents and which are, in the absence of cross-linking agents, permanently fusible. Generally, the phenolic polymer material found useful in practicing this invention is characterized by the presence of free hydroxyl groups and the absence of groups such as methylol, which tend to promote infusibility or cross-linking of the polymer, and by their solubility in organic solvents and relative insolubility in aqueous media. Again, obviously, mixtures of acidic materials can be employed.

Resoles, if they are still soluble, may be used, though subject to change in properties upon aging.

A laboratory method useful in the selection of suitable phenolic resins is the determination of the infra-red absorption pattern. It has been found that phenolic resins showing an absorption in the 3200–3500 cm.$^{-1}$ region (which is indicative of the free hydroxyl groups) and not having an absorption in the 1600–1700 cm.$^{-1}$ region are suitable. The latter absorption region is indicative of the desensitization of the hydroxyl groups and, consequently, makes such groups unavailable for reaction with the chromogenic materials.

The preparation of the phenolic formaldehyde polymeric materials for practicing this invention is described in "Industrial and Engineering Chemistry," volume 43, pages 134 to 141, January 1951, and a particular polymer thereof is described in Example 1 of U.S. Pat. No. 2,052,093, issued to Herbert Hönel on Aug. 25, 1936, and the preparation of the phenol-acetylene polymers is described in "Industrial and Engineering Chemistry," volume 41, pages 73 to 77, January 1949.

The preparation of the maleic anhydride copolymers is described in the literature, such as, for example, one of the maleic anhydride vinyl copolymers, as disclosed in the publication, "Vinyl and Related Polymers," by Calvin E. Schildknecht, Second printing, published April 1959, by John Wiley & Sons, Incorporated. See pages 65 to 68 (styrene-maleic anhydride copolymer), 628 to 630 (vinyl methyl ether-maleic anhydride copolymer), and 530 to 531 (ethylene-maleic anhydride copolymer).

When the acidic material is one of the aforementioned organic polymers, the liquid solvent chosen must be capable of dissolving the mark-forming components. The solvent may be volatile or nonvolatile, and a single or multiple component solvent may be used which is wholly or partially volatile. Examples of volatile solvents useful in the afore-described basic chromogen-acidic polymer are toluene, petroleum distillate, perchloroethylene, and xylene. Examples of non-volatile solvents are high-boiling point petroleum fractions and chlorinated biphenyls.

Generally, the solvent chosen should be capable of dissolving at least 0.3%, on a weight basis, of the chromogenic material, and about a 3–5%, on a weight basis, of the polymeric material to form an efficient reaction. However, in the preferred system, the solvent should be capable of dissolving an excess of the polymeric material, so as to provide every opportunity for utilization of the chromogenic material and, thus, to assure the maximum coloration at a reaction site.

A further criterion of the solvent is that it must not interfere with the mark-forming reaction. In some instances, the presence of the solvent may interfere with the mark-forming reaction or diminish the intensity of the mark, in which case the solvent chosen should be sufficiently vaporizable to assure its removal from the reaction site after having, through solution, brought the mark-forming components into intimate admixture, so that the mark-forming contact proceeds.

Since the mark-forming reaction requires an intimate mixture of the components to be brought about through solution of said components, one or more of the mark-forming components may be dissolved in the isolated solvent droplets, the only requirement being that at least one of the components essential to the mark-forming reaction be maintained isolated until reactively contacted with the other.

In the usual case, the mark-forming components are so chosen as to produce a mark upon application of pressure at room temperature (20 to 25 degrees centigrade). However, the present invention includes a system in which the solvent component is not liquid at temperatures around room temperature but is liquid and in condition for forming solutions at elevated temperatures.

The support member on which the components of the system are disposed may comprise a single or dual sheet assembly. In the case where all components are disposed on a single sheet, the record material is referred to as a "self-contained" system. Where there must be a migration of the solvent, with or without mark-forming component, from one sheet to another, the record material is referred to as a "transfer" system. (Such a system may also be referred to as a "two-fold" system, in that at least two sheets are required and each sheet includes a component, or components, essential to the mark-forming reaction.) Where a copious amount of the colored reaction product in liquid form is produced on a surface of one sheet, it may produce a mark by transfer to a second sheet as a colored mark.

In the preferred case, where microcapsules are employed, they may be present in the support material either disposed therethroughout or as a coating thereon, or both. The capsules may be applied to the sheet material while still dispersed in the liquid vehicles in which they were manufactured, or, if desired, separated and the separated capsules thereafter dispersed in a solution of the polymeric component (for instance 30 grams of water and 53 grams of a 1% aqueous solution of polyvinyl methyl ether maleic anhydride) to form a coating composition in which, because of the inertness of the solution and the capsules, both retain their identity and physical integrity. When this composition is disposed as a film on the support material and dried, the capsules are held therein subject to rupture to release the liquid contained. This latter technique, relying on the incompatibility of the microcapsules and the dispersing medium of the film-forming, mark-forming component, allows for a method of preparing a sensitive record coating with the capsules interspersed directly in a dry film of the polymeric material as it is laid down from the solution. A further alternative is to disperse in a liquid a medium one or more mark-forming components, insoluble therein, and disperse in said medium the insoluble microcapsules, with the result that all components of the mark-forming system may be disposed on or within the support sheet in the one operation. Obviously, the several components may be applied individually.

The respective amounts of the several components will vary, depending primarily upon the nature of the materials and the architecture of the record material unit. Suitable lower amounts include, in the case of the chromogenic material, about .005 to .075 pound per ream (a ream in this application meaning five hundred (500) sheets of 25″ x 38″ paper, totalling 3,300 square feet); in the case of the solvent, about 1 to 3 pounds per ream; and in the case of the polymer, about ½ pound per ream. In all instances, the upper limit is primarily a matter of economic consideration.

In the instance where the mark-forming components are interspersed throughout a single support sheet material (so-called self-contained unit), the following technique or procedure has been found useful:

The slurry of capsules may be applied to a "wet" web of paper as it exists on the screen of a Fourdrinier paper machine, so as to sink into the paper web a distance depending on the freeness of the pulp and the water content of the web at the point of application.

The capsules may be placed directly in the paper or in a support sheet. Not only capsule structures, but films which hold a multitude of droplets for local release in an area subject to pressure may be utilized. (See U.S. Pat. No. 2,299,694, which issued Oct. 20, 1942 to B. K. Green.)

With respect to the acidic organic polymeric component, a solution thereof in an evaporable solvent is introduced into twice as much water and agitated while the evaporable solvent is blown off by an air blast. This leaves an aqueous colloidal dispersion slurry of the polymeric material, which may be applied to the paper so as to leave a surface residue, or the slurry may be applied to paper at the size-press station of a paper-making machine by roller. In another method of making a polymer-sensitized sheet, the water-insoluble polymer is ground to the desired particle size in a ball mill with water, preferably with a dispersing agent, such as a small quantity of sodium silicate. If a binder material of hydrophilic properties is ground with the phenolic material, the binder itself may act as a dispersant. If desired, an amount of binder material of up to 40%, by weight, of the employed amount of the polymeric material may be added to the ball-milled slurry of materials, such binder materials being of the paper coating binder class, including gum arabic, caselin, hydroxyethylcellulose, and latex (such as styrene-butadiene copolymer). If desired, oil adsorbents in the form of fuller's earths may be added to the polymeric material particles to assist in retaining, in situ, the liquid droplets to be transferred to it in data-representing configuration, for the purpose of preventing "bleeding" of the print.

Another way of applying the chromogenic or polymeric material individually to a single sheet of paper is by immersing a sheet of paper in a 1% to 10% solution of the material in an evaporable solvent. Obviously, this must be done alone for each reactant, because if the other reactant material were present, it would result in a premature coloration over the sheet area. A dried sheet with one component then may be coated with a solution of the other component, the solvent of which is a non-solvent to the already supplied component.

The polymeric material may be dissolved in ink composition vehicles to form a printing "ink" of colorless character and, thus, may be used to spot-print a proposed record sheet unit sensitized for recording in a reaction-produced color in those areas by application of a solution of the chromogenic material.

In the case of phenolic polymer, a printing ink may be made of up to 75% weight, of the phenolic polymeric material in a petroleum solvent to a viscosity suitable for printing purposes. The relative amounts of components to be used are the most convenient and economical amounts consistent with proper visibility of the recorded data. The resolution of the recorded data is, among other things, dependent on particle size, distribution and amount of particles, liquid solvent migration, chemical reaction efficiency, and other factors, all of which are things that may be worked out empirically by one familiar with the art, and which do not determine the principle of the invention, which, in part, involves means for enabling the bringing into solution, by marking pressure, of two normally solid components in a common liquid solvent component held isolated as liquid droplets, preferably in marking-pressure-rupturable capsules having film walls, or else held isolated in a continuous marking-pressure-rupturable film as a discontinuous phase.

In the base-acid color system of this invention this acidic mark-forming component(s) reacts with the basic chromogenic material(s) to effect distinctive color formation or color change. In a multi-sheet system in which an acidic organic polymer is employed, it is desirable to include other materials to supplement the reactants. For example, kaolin can be added to improve the transfer of the liquid and/or the dissolved materials between the sheets. In addition, other materials such as bentonite, attapulgito, talc, feldspar, halloysite, magnesium trisilicate, silca gel, pyrophyllite, zinc sulfate, zinc sulfide, calcium sulfate, calcium citrate, calcium phosphate, calcium fluoride, barium sulfate and tannic acid can be included.

Various methods known to the prior art and disclosed in the aforementioned application S.N. 392,404 to Miller et al. and U.S. patent application S.N. 420,193 to Phillips et al., now U.S. Pat. No. 3,455,721, can be employed in coating compositions of the mark-forming materials into their supporting sheets. An example of the compositions which can be coated onto the surface of an underlying sheet of a two-sheet system to react with the capsule coating on the underside of an overlying sheet is as follows.

| Coating composition: | Percent by wt. |
| --- | --- |
| Phenolic polymer mixture | 17 |
| Paper coating kaolin (white) | 57 |
| Calcium carbonate | 12 |
| Styrene butadiene latex | 4 |
| Ethylated starch | 8 |
| Gum arabic | 2 |
| | 100 |

EXAMPLE I

The preparation of 3,3-bis-(1,2-dimethylindol-3-yl)-5-dimethylaminophthalide was conducted as follows:

14.3 grams of 1,2-dimethylindole, 9.6 grains of 4-dimethylaminophthalic anhydride, and 50 milliliters of benzene were stirred in a flask cooled in an ice bath. 16 grams of aluminum chloride was slowly added. The stirring was continued for forty minutes, thereafter the reaction mixture was maintained at a temperature of 45° C. in a water bath for two hours.

After cooling the reaction mixture to room temperature, the benzene solvent was removed by extraction with absolute ether. The solid material remaining the the flask was dissolved in 500 milliliters of a hot 3 normal hydrochloric acid solution. Upon cooling, 3-(2-carboxy-5 - di- methylaminobenzoyl) - 1,2 - dimethylindole having the structural formula:

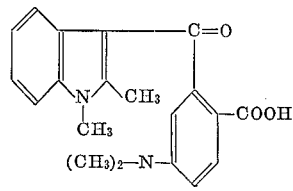

separated out as a precipitate exhibiting a weight of 14.2 grams.

The solution was neutralized, with ammonium hydroxide to a pH of 1; a precipitate was formed which was discarded. Upon further neutralization to a pH of 2.8, a second keto-acid, 3-(2'-carboxy-4' - dimethylaminobenzoyl)-1,2-dimethylindole having the structural formula:

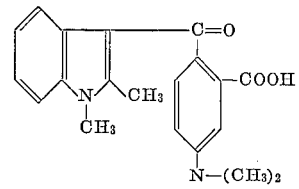

and exhibiting a weight of 0.85 gram was isolated out of the solution.

The synthesis of the 3,3-bis-(1,2-dimethylindol-3-yl)-5-dimethylaminophthalide was effected by the following procedure:

0.5 gram of 3-(2'-carboxy - 4'-dimethylaminobenzoyl)-1,2-dimethylindole prepared in the foregoing procedure was heated with 0.3 gram of 1,2-dimethylindole in 10 milliliters of acetic anhydride to the boiling point of the mixture for 5 to 10 minutes. The reaction mixture was hydrolyzed with water, made alkaline with sodium hydroxide to a pH of about 12, and extracted with benzene. From the benzene extract 3,3-bis-(1,2-dimethylindol-3-yl)-5-dimethylaminophthalide was isolated and purified; the product exhibited a melting point of 298° C. and a weight of 0.27 gram. When a benzene solution of the product was contacted with attapulgite clay coated on paper and with a phenolic resin coated on paper, a red color was observed.

EXAMPLE II 3,3 - bis - (1,2 - dimethylindol-3-yl) - 6-dimethylaminophthalide was prepared according to the procedure of Example I using the second keto-acid 3-(2'-carboxy-4'-dimethylaminobenzoyl)-1,2 - dimethylindole which was prepared but not used in the conduct of Example I was used instead of the keto-acid of Example I. The purified product exhibited a melting point above 300° C.

When the 3,3 - bis - (1,2-dimethylindol-3-yl)-6-dimethylaminophthalide product in benzene solution was applied to paper coated with attapulgite clay and paper coated with a phenolic polymer vivid red colors were produced.

EXAMPLE III

The preparation of the compounds 3,3-bis-(9-ethylcarbazol-3-yl)-5-dimethylaminophthalide and 3,3 - bis - (9-ethylcarbazol-3-yl)-6 - dimethylaminophthalide was conducted as follows:

23.4 grams of 9-ethylcarbazole was mixed with 7.64 grams of 4-dimethylaminophthalic anhydride and heated on an oil bath at 80° C. The mixture appeared to be fluid; 12.0 grams of aluminum chloride was added slowly. The oil bath temperature was increased to 110° C. over a period of twenty minutes, whereupon the reaction mixture solidified. Sixty milliliters of benzene was added during a time increment of one hundred eighty minutes after which 25.0 grams of 1,2-dimethylindole was added to the reaction mixture; followed by stirring for thirty minutes. An additional quantity of 5 milliliters of acetic anhydride was added to the reaction mixture. The oil bath was removed (the temperature of the oil bath had been increased to 105° C.) and the reaction mixture was stirred while it cooled. The reaction mixture was decomposed with a 3 normal solution of hydrochloric acid; benzene was added to the reaction mixture and the acid was neutralized with sodium hydroxide. A benzene layer formed and was separated from a black resinous material in an aqueous layer.

A black resinous material 3,3-bis-(9-ethylcarbazol-3-yl)-5-dimethylaminophthalide and 3,3-bis - (9 - ethylcarbazol - 3 - yl) - 6 - dimethylaminophthalide was isolated and purified. The white, solid product exhibited a weight of .18 grams and a melting point range of 187 to 190° C. A solution of the product in benzene appeared purple when contacted with attapulgite clay coated on paper or with a phenolic polymer coated on paper.

EXAMPLE IV

The preparation of 3,3-bis-(2-phenylindol-3-yl)-5 - dimethylaminophthalide and 3,3 - bis - (2 - phenylindol-3-yl)-6-dimethylaminophthalide was conducted as follows:

5.8 grams of 2-phenylindole, 5.7 grams of 4-dimethylaminophthalic anhydride, and 40 milliliters of benzene were stirred in a 100 milliliter flask under ice-cooling. 18.8 grams of aluminum chloride were slowly added. After the addition of 0.5 gram of aluminum chloride, the addition was stopped momentarily until the reaction mixture became fluid. After stirring for 180 minutes the contents of the flask were semi-solid.

The semi-solid complex was decomposed using 100 milliliters of 3 normal hydrochloric acid to yield a solid. The solid was treated with 300 milliliters of dilute ammonium hydroxide, the mixture heated to boiling and then the hot mixture was filtered. The filtrate was acidified and a green oil separated into a layer. The oil was stirred with an excess of water and a yellow solid precipitate was obtained. The yellow solid precipitate was boiled in 200 milliliters of benzene to purify the intermediate of any entrained starting materials. A yellow insoluble intermediate product exhibited a weight of 7.1 grams. The intermediate was a mixture of 2'-carboxy-5'-dimethylaminobenzoyl-2-phenylindole and 2' - carboxy - 4' - dimethylaminobenzoyl-2-phenylindole.

The intermediate prepared in the foregoing procedure was used in the synthesis of 3,3-bis-(2-phenylindol-3-yl)-5-dimethylaminophthalide and 3,3 - bis - (2 - phenylindol-3-yl)-6-dimethylaminophthalide. 1.9 grams of 2'-carboxy-5'-dimethylaminobenzoyl-2-phenylindole, 0.96 gram of 2-phenylindole, and 10 milliliters of acetic anhydride were stirred and heated on a hot plate for 20 minutes. A precipiate formed which was filtered from solution. A filtrate was poured into 150 milliliters of water; the mixture thus formed was made alkaline with ammonium hydroxide. A precipitate from the latter mixture was formed, separated from the liquid, dissolved in benzene and precipitated with petroleum ether. The solid material on further purification yielded a product exhibiting a weight of 100 milligrams and a melting point of about 200° C. A solution of the 3,3-bis-(2-phenylindole-3 - yl) - 5 - dimethylaminophthalide and 3,3-bis-(2-phenylindole-3-yl)-6-dimethylaminophthalide in benzene appeared blue when contacted with attapulgite coated on paper and blue when contacted with a phenolic polymer coated on paper.

EXAMPLE V

The compounds 3-(1,2-dimethylindol-3-yl)-3-(9-ethylcarbazol-3-yl)-5-dimethylaminophthalide and 3-(1,2 - dimethylindol-3-yl)-3-(9-ethylcarbazol-3-yl) - 6 - dimethylaminophthalide were prepared in the following procedure:

23.4 grams of 9-ethylcarbazole was mixed with 7.64 grams of 4-dimethylaminophthalic anhydride and heated on an oil bath at 80° C. When the mixture appeared to be fluid, 12.0 grams of aluminum chloride was slowly added. The temperature of the oil bath was slowly raised to 110° C.; and after twenty minutes the reaction mixture solidified. A 60 milliliter quantity of benzene was added to the solidified reaction mixture over a time interval of 180 minutes, after which 25.0 grams of 1,2-dimethylindole was added. After stirring for 30 minutes the mixture was fluid and an additional 5 milliliters of acetic anhydride was added. The temperature of the oil bath was raised to 105° C., whereupon the oil bath was removed and the flask allowed to cool while being stirred for 30 minutes. The reaction mixture was decomposed with a 3 normal solution of hydrochloric acid; benzene was added to the reaction mixture and the acid was neutralized with sodium hydroxide. A benzene layer formed and was separated from a black resinous material in an aqueous layer. A product was isolated and purified by chromatography. The white solid product, melting at 294° C., exhibited a weight of 40 milligrams. A solution of the product in benzene appeared to turn red when contacted with attapulgite clay coated on paper and also red when contacted with a phenolic polymer coated on paper.

EXAMPLE VI

Preparation of 3,3-bis-(1-methyl-2-phenylindol-3-yl)-5-dimethylaminophthalide and 3,3-bis-(1-methyl-2 - phenylindol-3-yl)-6-dimethylaminophthalide.

4.1 grams of 1-methyl-2-phenylindole, 3.8 grams of 4-dimethylaminophthalic anhydride and 30 milliliters of benzene were stirred in a 100 milliliter flask under ice-cooling. 2.9 grams of anhydrous aluminum chloride was added slowly. Stirring was continued at 5–14° C. for one hour, and 50–70° C. for another hour. Petroleum ether was employed to extract the benzene and thereupon leaving a solid. The solid was decomposed with 200 milliliters of water, the precipitate thus formed being removed by filtration. The precipitate was dissolved in 200 milliliters of 5 N ammonium hydroxide and filtered. The filtrate upon neutralization with dilute hydrochloric acid to a pH of about 3 yielded the following isomeric acids, A and B weighing 4.3 grams:

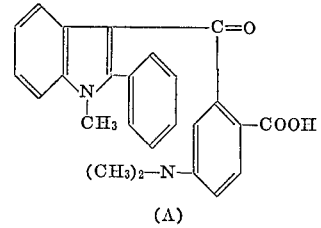

(A)

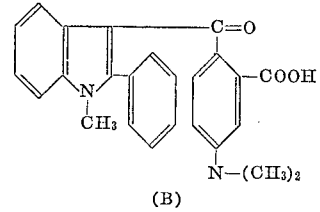

(B)

The crude isomeric acids, without further purification, were reacted with 1-methyl-2-phenylindole in the presence of acetic anhydride as in Example I. The product, a mixture of bis-(1-methyl-2-phenylindol - 3 - yl) - 5 - dimethylaminophthalide and bis-(1-methyl-2-phenylindol-3-yl)-6-dimethylaminophthalide was chromatographed employing an alumina column. Solution of the product in benzene imparted a blue-purple to both attapulgite clay coated on paper and phenolic resin coated on paper.

What is claimed is:
1. A pressure sensitive record unit comprising:
 (a) support web or sheet material,
 (b) mark-forming components and a pressure-releasable liquid solvent for said mark-forming components arranged in contiguous juxtaposition and supported by said sheet material,
 (c) at least one of the mark-forming components being maintained in isolation from the other mark-forming components prior to the pressure release of the solvent, and (d) said mark-forming components comprising at least one chromogenic material of the structure:

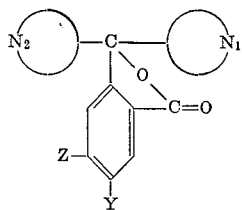

where

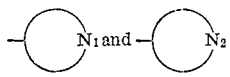

are selected from the group consisting of mono and disubstituted indolyl radicals having the structural formula:

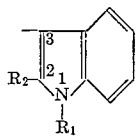

and carbazolyl radicals having the structural formula:

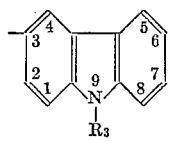

where $R_1$, $R_2$ and $R_3$ consist of alkyl from one to four carbon atoms, phenyl, and hydrogen; where Y and Z consist of hydrogen and dialkylamino which the alkyl substituents have from one to four carbon atoms, providing that one of Y and Z must be hydrogen and the other must be said dialkylamino and an electron-accepting material of the Lewis acid type reactive with said chromogenic material to produce a mark; which components upon pressure-release of the liquid solvent are brought into reactive contact in the released solvent.

2. The record unit of claim 1 wherein the liquid solvent is present as the nucleus of a microcapsule.

3. The record unit of claim 1 wherein the chromogenic material is dissolved in the isolated liquid solvent prior to pressure release.

4. The record unit of claim 1 wherein the mark-forming components and the isolated liquid solvent are present in a single support sheet.

5. The record unit of claim 1 wherein at least one member selected from the group consisting of the mark-forming components and the liquid solvent is present in a support sheet other than the support sheet having the remaining members of the group.

6. The record sheet material of claim 1 where the electron-accepting material of the Lewis acid type comprises a clay.

7. The record sheet material of claim 1 where the electron-accepting material of the Lewis acid type comprises at least one organic polymer.

8. The record sheet of claim 7 wherein the organic polymer is a phenolic polymer.

9. The record sheet material of claim 1 where the chromogenic material includes the compound 3,3-bis-(1,2-dimethylindol-3-yl)-5-dimethylaminophthalide.

10. The record sheet material of claim 1 where the chromogenic material includes the compound 3,3-bis-(1,2-dimethylindol-3-yl)-6-dimethylaminophthalide.

11. The record sheet material of claim 1 where the chromogenic material includes the compound 3,3-bis-(9-ethylcarbazol-3-yl)-5-dimethylaminophthalide.

12. The record sheet material of claim 1 where the chromogenic material includes the compound 3,3-bis-(9-ethylcarbazol-3-yl)-6-dimethylaminophthalide.

13. The record sheet material of claim 1 where the chromogenic material includes the compound 3,3-bis-(2-phenylindol-3-yl)-5-dimethylaminophthalide.

14. The record sheet material of claim 1 where the chromogenic material includes the compound 3,3-bis-(2-phenylindol-3-yl)-6-dimethylaminophthalide.

15. The record sheet material of claim 1 where the chromogenic material includes the compound 3,3-bis-(1-methyl-2-phenylindol-3-yl)-5-dimethylaminophthalide.

16. The record sheet material of claim 1 where the chromogenic material includes the compound 3,3-bis-(1-methyl-2-phenylindol-3-yl)-6-dimethylaminophthalide.

17. The record sheet material of claim 1 where the chromogenic material includes the compound 3-(1,2-dimethylindol-3-yl)-3-(9-ethylcarbazol-3-yl)-5-dimethylaminophthalide.

18. The record sheet material of claim 1 where the chromogenic material includes the compound 3-(1,2-dimethylindol-3-yl)-3-(9-ethylcarbazol-3-yl)-6-dimethylaminophthalide.

19. A mark-forming manifold, comprising: a first web or sheet having on one surface a transfer coating which contains as a finely dispersed phase a plurality of minute, pressure-rupturable, capsules containing as an inner phase a solvent vehicle; a second web or sheet having an adherent coating upon its surface or dispersed within said web or sheet, said first and second webs or sheets being maintained disposed together in face-to-face relationship with said respective transfer and adherent coatings in contiguity with each other; one coating constituent in the form of a substantially colorless or slightly colored chromogenic material which includes as a major functional arrangement the molecular structure:

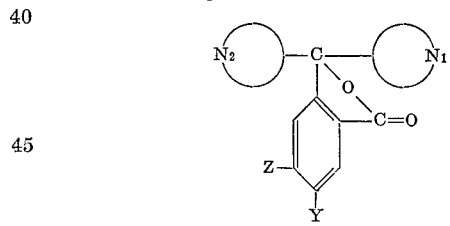

where

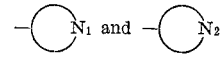

are selected from the group consisting of mono and disubstituted indolyl having the structural formula:

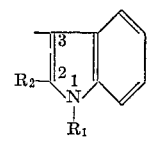

and carbazolyl having the structural formula:

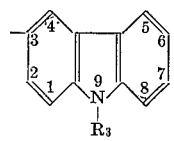

where $R_1$, $R_2$, and $R_3$ consist of alkyl having from one to four carbon atoms, phenyl, and hydrogen; where the substituents for hydrogen Z and Y consist of hydrogen and dialkylamino where the alkyl substituents have from one to four carbon atoms and providing that one of Z and Y must be hydrogen and the other must be said dialkylamino; and another constituent consisting of an electron-accepting material of the Lewis acid type; one of said constituents being dissolved in said solvent liquid vehicle present as the inner phase of the plurality of minute pressure-rupturable capsules in the transfer coating on or within said first web or sheet, and the other of said coating constituents being bonded to said second web in said adherent coating thereon but being accessible to other materials coming into contact with portions of the adherent coating, whereby upon local impact and rupture of said capsules, releasing said liquid vehicle containing one coating constituent from at least some of the capsules onto said contiguous adherent coating, reactive contact is effected between said two constituents to produce a dark-colored material by the action of said electron-accepting material of the Lewis acid type upon said chromogenic material to effect color change on said chromogenic compound.

20. The mark-forming manifold of claim 19 in which the electron-accepting material of the Lewis acid type comprises a clay.

21. The mark-forming manifold of claim 19 in which the electron-accepting material of the Lewis acid type comprises an organic polymer.

22. The mark-forming manifold of claim 19 in which the electron-accepting material of the Lewis acid type comprises a phenolic polymer.

23. The mark-forming manifold of claim 19 in which at least one chromogenic compound is 3,3-bis-(1,2-dimethylindol-3-yl)-5-dimethylaminophthalide.

24. The mark-forming manifold of claim 19 in which at least one chromogenic compound is 3,3-bis-(1,2-dimethylindol-3-yl)-6-dimethylaminophthalide.

25. The mark-forming manifold of claim 19 in which at least one chromogenic compound is 3,3-bis-(9-ethylcarbazol-3-yl)-5-dimethylaminophthalide.

26. The mark-forming manifold of claim 9 in which at least one chromogenic compound is 3,3-bis-(9-ethylcarbazol-3-yl)-6-dimethylaminophthalide.

27. The mark-forming manifold of claim 19 in which at least one chromogenic compound is 3,3-bis-(2-phenylindol-3-yl)-5-dimethylaminophthalide.

28. The mark-forming manifold of claim 19 in which at least one chromogenic compound is 3,3-bis-(2-phenylindol-3-yl)-6-dimethylaminophthalide.

29. The mark-forming manifold of claim 19 in which at least one chromogenic compound is 3,3-bis-(1-methyl-2-phenylindol-3-yl)-5-dimethylaminophthalide.

30. The mark-forming manifold of claim 19 in which at least one chromogenic compound is 3,3-bis-(1-methyl-2-phenylindol-3-yl)-6-dimethylaminophthalide.

31. The mark-forming manifold of claim 19 in which at least one chromogenic compound is 3-(1,2-dimethylindol-3-yl)-3-(9-ethylcarbazol-3-yl) - 5 - dimethylaminophthalide.

32. The mark-forming manifold of claim 19 in which at least one chromogenic compound is 3-(1,2-dimethylindol-3-yl)-3-(9-ethylcarbazol-3-yl) - 6 - dimethylaminophthalide.

33. The method of marking on a substrate by developing dark-colored materials from chromogenic compounds comprising: providing as at least one constituent a colorless or slightly colored chromogenic compound having the structural formula:

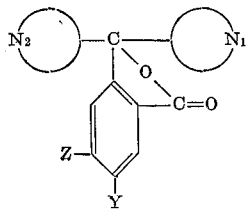

where

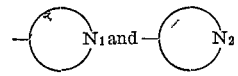

are selected from the group consisting of mono and di-substituted indolyl radicals having the structural formula:

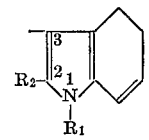

and carbazoyl radicals having the structural formula:

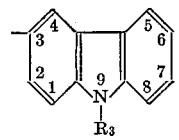

where $R_1$, $R_2$ and $R_3$ consist of alkyl having from one to four carbon atoms, phenyl, and hydrogen; where Z and Y consist of dialkylamino where the alkyl substituents have from one to four carbon atoms providing that one of Z and Y must be hydrogen and the other must be said dialkylamino and bringing said chromogenic compound into contact, in areas on said substrate sheet where marking is desired, with an electron-accepting material of the Lewis acid type to produce marks in said areas of a dark-colored material formed by the action of said electron-accepting material on said chromogenic compound.

34. The method of claim 33 in which the electron-accepting material of the Lewis acid type comprises a clay.

35. The method of claim 33 in which the electron-accepting material of the Lewis acid type comprises an organic polymer.

36. The method of claim 33 in which the electron-accepting material of the Lewis acid type comprises a phenolic polymer.

37. The method of claim 33 in which at least one chromogenic compound is 3,3-bis-(1,2-dimethylindol-3-yl)-5-dimethylaminophthalide.

38. The method of claim 33 in which at least one chromogenic compound is 3,3-bis-(1,2-dimethylindol-3-yl)-6-dimethylaminophthalide.

39. The method of claim 33 in which at least one chromogenic compound is 3,3-bis-(9-ethylcarbazol-3-yl)-5-dimethylaminophthalide.

40. The method of claim 33 in which at least one chromogenic compound is 3,3-bis-(9-ethylcarbazol-3-yl)-6-dimethylaminophthalide.

41. The method of claim 33 in which at least one chromogenic compound is 3,3-bis-(2-phenylindol-3-yl)-5-dimethylaminophthalide.

42. The method of claim 33 in which at least one chromogenic compound is 3,3-bis-(2-phenylindol-3-yl)-6-dimethylaminophthalide.

43. The method of claim 27 in which at least one chromogenic compound is 3-(1,2-dimethylindol-3-yl)-3-(9-ethylcarbazol-3-yl)-5-dimethylaminophthalide.

44. The method of claim 33 in which at least one chromogenic compound is 3-(1,2-dimethylindol-3-yl)-3-(9-ethylcarbazol-3-yl)-6-dimethylaminophthalide.

45. The method of claim 33 in which at least one chromogenic compound is 3,3-bis-(1-methyl-2-phenylindol-3-yl)-5-dimethylaminophthalide.

46. The method of claim 33 in which at least one chromogenic compound is 3,3-bis-(1-methyl-2-phenyl-indol-3-yl)-6-dimethylaminophthalide.

References Cited

UNITED STATES PATENTS

| | | |
|---|---|---|
| 2,505,486 | 4/1950 | Green. |
| 3,244,549 | 4/1966 | Farnham et al. |
| 3,268,537 | 8/1966 | Gosnell et al. |
| 3,336,337 | 8/1967 | Gosnell. |
| 3,455,721 | 7/1969 | Phillips et al. |
| 3,491,111 | 1/1970 | Lin. |

MURRAY KATZ, Primary Examiner

U.S. Cl. X.R.

117—36.8, 36.9, 155